United States Patent Office 3,708,489
Patented Jan. 2, 1973

3,708,489
AZIDO-ARYL 1,4-DIHYDROPYRIDINES AND THEIR PRODUCTION
Dietrich Rucker, Bietigheim, Frederich Bossert and Horst Meyer, Wuppertal-Elberfeld, and Wulf Vater, Opladen, Germany, assignors to Farbenfabriken Bayer Aktiengesellschaft, Leverkusen, Germany
No Drawing. Filed Mar. 17, 1971, Ser. No. 125,427
Claims priority, application Germany, Mar. 20, 1970, P 20 13 431.0
Int. Cl. C07d 31/36
U.S. Cl. 260—295.5 R
35 Claims

ABSTRACT OF THE DISCLOSURE

Azido-aryl 1,4-dihydropyridines of the formula:

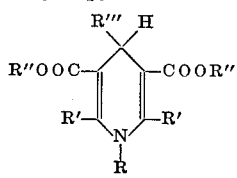

wherein

R is hydrogen, straight, branched or cyclic lower alkyl, lower alkenyl or lower alkinyl, unsubstituted or substituted by hydroxyl or alkoxy of 1 to 3 carbon atoms; or benzyl, or phenethyl, unsubstituted or substituted in the aryl portion by 1 to 3 members selected from the group consisting of 1 to 3 alkoxy moieties of 1 to 3 carbon atoms, 1 or 2 alkyl moieties of 1 to 3 carbon atoms, and 1 or 2 halogen atoms;

R' is straight or branched chain alkyl of 1 to 4 carbon atoms;

R" is straight, branched or cyclic lower alkyl, lower alkenyl or lower alkinyl, straight, branched or cyclic lower alkyl, lower alkenyl or lower alkinyl, the carbon atom chain or ring of which is interrupted by 1 or 2 oxygen atoms or straight, branched or cyclic lower alkyl, lower alkenyl or lower alkinyl substituted by hydroxyl or substituted by hydroxyl and the carbon atom chain or ring of which is interrupted by 1 or 2 oxygen atoms; and R''' is aryl substituted by an azido moiety and further unsubstituted or substituted by 1 or 2 members selected from the group consisting of 1 or 2 alkyl moieties of 1 to 4 carbon atoms, 1 or 2 fluoroalkyl moieties of 1 to 4 carbon atoms, 1 or 2 alkoxy moieties of 1 to 4 carbon atoms and 1 or 2 halogen atoms, are useful for their coronary dilating effect, their nitrite-like effect on the heart, their anti-fibrillation effect, their vascular-spasmolytic effect and muscular-spasmolytic effect, and as anti-hyptensives.

The present invention is concerned with azido-aryl 1,4-dihydropyridines, processes for their production, pharmaceutical compositions embodying said azido-aryl 1,4-dihydropyridines as the active ingredient and methods of administration which utilize the administration of said azido-aryl 1,4-dihydropyridines orally, parenterally or perlingually.

More particularly, the present invention relates to azido-aryl 1,4-dihydropyridines of the formula:

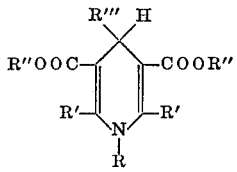
(I)

wherein

R is hydrogen, straight, branched or cyclic lower alkyl, preferably of 1 to 6 carbon atoms, lower alkenyl preferably of 2 to 6 carbon atoms, or lower alkinyl preferably of 2 to 6 carbon atoms, unsubstituted or substituted by hydroxyl or alkoxy of 1 to 3 carbon atoms; or benzyl, or phenethyl, unsubstituted or substituted in the aryl portion by 1, 2 or 3 members selected from the group consisting of 1, 2 or 3 alkoxy moieties of 1, 2 or 3 carbon atoms, 1 or 2 alkyl moieties of 1, 2 or 3 carbon atoms, and 1 or 2 halogen atoms (especially fluorine, chlorine or bromine);

R' is straight or branched chain alkyl of 1 to 4 carbon atoms;

R" is straight or branched chain lower alkyl preferably of 1 to 6 carbon atoms, lower alkenyl preferably of 2 to 6 carbon atoms, or lower alkinyl preferably of 2 to 6 carbon atoms, cyclic alkyl preferably of 3 to 6 carbon atoms, alkenyl preferably of 3 to 6 carbon atoms or alkinyl preferably of 3 to 6 carbon atoms, straight or branched chain lower alkyl preferably of 2 to 6 carbon atoms, lower alkenyl preferably of 2 to 6 carbon atoms or lower alkinyl preferably of 2 to 6 carbon atoms, the carbon atom chain of which is interrupted by 1 or 2 oxygen atoms, cyclic alkyl preferably of 3 to 6 carbon atoms, alkenyl preferably of 3 to 6 carbon atoms or alkinyl preferably of 3 to 6 carbon atoms wherein the ring has 1 or 2 oxygen heteroatoms, straight or branched chain lower alkyl preferably of 1 to 6 carbon atoms, lower alkenyl preferably of 2 to 6 carbon atoms or lower alkinyl preferably of 2 to 6 carbon atoms substituted by hydroxyl, cyclic alkyl preferably of 3 to 6 carbon atoms, alkenyl preferably of 3 to 6 carbon atoms or alkinyl preferably of 3 to 6 carbon atoms substituted by hydroxyl, lower alkyl preferably of 2 to 6 carbon atoms, lower alkenyl preferably of 2 to 6 carbon atoms or lower alkinyl preferably of 2 to 6 carbon atoms substituted by hydroxyl and interrupted by 1 or 2 oxygen atoms or cyclic alkyl preferably of 3 to 6 carbon atoms, alkenyl preferably of 3 to 6 carbon atoms or alkinyl preferably of 3 to 6 carbon atoms substituted by hydroxyl and wherein the ring has 1 or 2 oxygen heteroatoms; and R''' is aryl substituted by an azido moiety and further unsubstituted or substituted by 1 or 2 members selected from the group consisting of 1 or 2 alkyl moieties of 1 to 4 carbon atoms, 1 or 2 fluoroalkyl moieties of 1 to 4 carbon atoms, 1 or 2 alkoxy moieties of 1 to 4 carbon atoms and 1 or 2 halogen atoms.

The preferred aryl moiety for R''' is phenyl.

These compounds are useful as coronary dilators, for their nitrite-like effect on the heart, as anti-fibrillation agents, for their vascular-spasmolytic and muscular-spasmolytic effect, and as antihypertensives.

The compounds of the present invention may be produced by reacting an aldehyde of the formula:

(II)

wherein

R''' is as above defined, either (a) with an acyl-fatty acid ester of the formula:

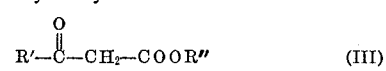
(III)

wherein

R' and R" are as above defined, with ammonia or an amine of the formula:

(IV)

wherein

R is as above defined, or a salt thereof, or (b) with an enamine of the formula:

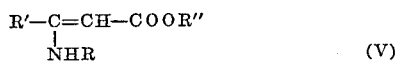

$$R'-C=CH-COOR''$$
$$\phantom{R'-C=}|\phantom{H-COO}$$
$$\phantom{R'-C=}NHR \qquad\qquad (V)$$

wherein

R, R' and R" are as above defined, at an elevated temperature preefrably from about 70° C. to about 120° C., in the presence of at least one organic solvent, such as an alcohol, dioxane, glacial acetic acid, dimethylformamide or acetonitrile, or in water. When an organic solvent is used, it is preferred to carry out the reaction at approximately the boiling point of the solvent or of the solvent mixture.

When R in Formula I above is other than hydrogen, the compounds of the present invention may be produced according to a process carried out in the presence of pyridine, which process is set forth in co-pending application U.S. Ser. No. 35,574, filed May 7, 1970.

The compounds of the invention in which R is other than hydrogen may also be prepared by:

(i) Oxidizing a 1,4-dihydropyridine of general Formula I, in which R is hydrogen, to obtain a pyridine derivative;

(ii) Quaternizing the pyridine derivative with an alkyl ester to obtain an N-substituted pyridine derivative; and (iii) Reducing the N-substituted pyridine derivative to obtain the desired 1,4-dihydropyridine.

An analogous process is disclosed in Helv. Chim. Acta., 41, 2066 [1958].

Some of the azido aldehydes (II) required as starting material for the condensation are known from the literature. They can be prepared, for example, by diazotizing the corresponding aminobenzaldehydes and reacting the diazonium salts with sodium azide [J. Chem. Soc. 97, 254 (1910)].

Suitable reactants for use in the processes of the present invention and for the production of the compounds of the present invention include as illustrative examples the following:

Esters (III): formylacetic acid ethyl ester, formylacetic acid butyl ester, acetoacetic acid methyl ester, acetoacetic acid ethyl ester, acetoacetic acid propyl ester, acetoacetic acid isopropyl ester, acetoacetic acid butyl ester, acetoacetic acid-($\alpha$- or $\beta$)-hydroxyethyl ester, acetoacetic acid-($\alpha$- or $\beta$)-methoxyethyl ester, acetoacetic acid-($\alpha$- or $\beta$)-ethoxyethyl ester, acetoacetic acid-($\alpha$- or $\beta$)-propoxyethyl ester, acetoacetic acid furfuryl ester, acetoacetic acid tetrahydrofurfuryl ester, acetoacetic acid allyl ester, acetoacetic acid propargyl ester, acetoacetic acid cyclohexyl ester, propionylacetic acid ethyl ester, butyrylacetic acid ethyl ester, and isobutyrylacetic acid ethyl ester.

Thus R' is preferably hydrogen, methyl, ethyl, butyl or isobutyl. R" is preferably methyl, ethyl, propyl, isopropyl, butyl, $\alpha$- or $\beta$-hydroxyethyl, $\alpha$- or $\beta$-methoxyethyl, $\alpha$- or $\beta$-ethoxyethyl, $\alpha$- or $\beta$-propoxyethyl, furfuryl, tetrahydro-furfuryl, allyl, propargyl or cyclohexyl.

Any primary amine can be used as the amine component (IV). However, illustrative examples of amines particularly suitable for use as component (IV) are: methylamine, ethylamine, propylamine, isopropylamine, butylamine, allylamine, propargylamine, 1-hydroxyethylamine-2, 1,3-dihydroisopropylamine, cyclohexylamine, 4-chloro-benzylamine, 3,4-dimethoxybenzylamine and phenethylamine.

Thus R is preferably methyl, ethyl, propyl, butyl, allyl, propargyl, 2-hydroxy-ethyl, 1,3-dihydroxy-isopropyl-2, cyclohexyl, benzyl, 4-chlorobenzyl, 3,4-dimethoxybenzyl or phenethyl.

According to a particularly preferred embodiment, R is hydrogen, alkyl of 1 to 4 carbon atoms or benzyl, R' is alkyl of 1 to 4 carbon atoms, R" is alkyl of 1 to 4 carbon atoms, alkenyl of 3 or 4 carbon atoms, alkinyl of 3 or 4 carbon atoms or alkoxy of 1 to 4 carbon atoms substituted by alkyl of 1 to 3 carbon atoms, and R''' is azidophenyl unsubstituted or substituted by 1 or 2 groups selected from the group consisting of methyl, trifluoromethyl, methoxy, chlorine or bromine.

The azido-aryl 1,4-dihydropyridines of the present invention have a broad range of utility as indicated above and the following effects have been exhibited in animal experiments:

(1) The compounds produce a distinct and long-lasting dilation of the coronary vessels on parenteral, oral and perlingual administration. This action on the coronary vessels is intensified by a simultaneous, nitrite-like effect of reducing the load on the heart. They influence or modify the heart metabolism in the sense of a saving of energy.

(2) The excitability of the stimulus-forming and stimulus-conducting system within the heart is lowered, so that an anti-fibrillation action, demonstrable in therapeutic doses, results.

(3) The tone of the smooth muscles of the vessels is greatly reduced under the action of the compounds. This vascular-spasmoyltic action can occur in the whole vascular system or can manifest itself to a more or less isolated extent in circumscribed vascular regions (such as for example the central-nervous system).

(4) The compounds reduce the blood pressure of normal tonic and hypertonic animals and can thus be used as anti-hypertensive agents.

(5) The compounds have strong muscular-spasmoyltic actions, which manifest themselves on the smooth muscle of the gastro-intestinal tract, the urogenital tract, and the respiratory system.

According to the present invention, pharmaceutical compositions are produced which comprise a compound of the present invention or more than one compound of the present invention in combination with a pharmaceutically acceptable non-toxic inert diluent or carrier. The present invention further includes a medicament in unit dosage form which comprises a compound of the present invention or more than one compound of the present invention per se or in combination with a pharmaceutically acceptable non-toxic inert diluent or carrier. The medicament may include a protective envelope containing the active compound or compounds, and if present, the pharmaceutically acceptable non-toxic inert diluent or carrier.

In the present specification the expression "pharmaceutically acceptable non-toxic inert diluent or carrier" means a non-toxic substance that when mixed with the active ingredient or ingredients renders it suitable for administration. The expression preferably excludes water and low-molecular weight organic solvents commonly used in chemical synthesis, except in the presence of other pharmaceutically necessary ingredients such as salts in correct quantities to render the composition isotonic, buffers, surfactants, coloring and flavoring agents, and preservatives. Examples of suitable liquid diluents and carriers are vegetable oils, polyols, buffered aqueous solutions, isotonic saline aqueous solutions, syrups and lotion bases. Examples of suitable solid diluents and carriers are starches, cellulose and its derivatives, sugars, stearates and stearic acid, talc and ointment bases. Examples of pharmaceutical compositions according to the invention are sprays, aqueous suspensions, elixirs, syrups and powders, either free-flowing or compressed into tablets.

The new azido-aryl 1,4-dihydropyridines may be administered orally, either per se or as an orally administrable pharmaceutical composition. Examples of diluents and carriers suitable for use in orally administrable pharmaceutical compositions are solid vehicles, excipients, binding agents and lubricants such as glucose, lactose and sucrose, corn and potato starch, sodium carboxymethyl-cellulose, ethyl celluose and cellulose acetate, powdered gum tragacanth, gelatin, alginic acid, agar, stearic acid and sodium, calcium, and magnesium stearates, sodium lauryl sulphate, polyvinylpyrollidone, sodium citrate, calcium carbonate, dicalcium phosphate.

Orally administrably pharmaceutical compositions according to the invention may also comprise liquid diluents such as water, ethanol, propylene glycol, glycerol or combinations thereof.

The pharmaceutical compositions of the invention may also contain other non-toxic adjuvants and modifiers such as dyes, surfactants, emulsifiers, perfumes, flavoring agents, preservatives and biocides.

The new active azido-aryl 1,4-dihydropyridines can also be administered by parenteral injection. Examples of suitable diluents carriers for parenteral administration are solvents and suspending diluents such as water and water-miscible or solvents, sesame oil, peanut oil, aqueous propylene glycol and N,N-dimethyl formamide. Examples of pharmaceutical compositions of the invention are sterile aqueous solutions of the active ingredient, which may be buffered with a pharmaceutically acceptable buffer and rendered isotonic with the addition of the necessary amount of salt or glucose and are preferably pyrogen-free.

The pharmaceutical compositions of the invention preferably contain 0.5 to 90 wt. percent of the active ingredient.

The present invention also provides medicaments of dosage unit form as hereinafter defined comprising as an active ingredient at least one of the new azido-aryl 1,4-dihydropyridines either alone or in admixture with a pharmaceutically acceptable non-toxic inert diluent or carrier. In this the diluent or carrier is preferably as defined above, but can, in particular, be water or another common solvent.

The term "medicament in unit dosage form" as used above means a medicament as defined above in the form of discrete portions each containing a unit dosage, or a multiple or sub-multiple of a unit dose of the active compound or compounds, for example two, three or four unit doses or a half, a third or a fourth of a unit dose. "Unit dose" is the amount of the active ingredient(s) administered on one occasion and will usually be a daily dose, or for example a half, a third, or a quarter of a daily dose depending on whether the medicant is to be administered once or, for example, twice or three times, or four times a day. Such portions may, for example, be in monolithic coherent form, such as tablets, suppositories, pills or drageés; in wrapped or concealed form, such as wrapped powders, cachets, sachets or capsules; in ampoules, either free or as a sterile solution suitable for parenteral injection; or in any other form known to the art.

In general, it has proved advantageous to administer amounts of about 0.01 mg. to about 100 mg., preferably about 0.05 to 50 mg. per kg. body weight per day, in order to achieve satisfactory results. Nevertheless, it may sometimes be necessary to deviate from the above ranges, depending on the body weight of the treated person or the method of application. In some cases it may be sufficient to use less than the minimum amount stated above, whereas in other cases the aforesaid upper limit will have to be exceeded. If larger amounts are applied, it may be advisable to distribute these in several individual doses over the day.

Thus, the medicaments in dosage unit form according to the invention are preferably adapted for a unit dose of 0.5 to 9000 mg.; that is, each portion of the medicament will preferably contain from 0.5 to 9000 mg., most preferably from 2.5 to 4500 mg., of the active ingredient.

The azido-aryl 1,4-dihydropyridines of the present invention are particularly useful because they are suitable for oral administration. Therefore, pharmaceutical compositions in orally administrable form are the preferred embodiment of the pharmaceutical compositions.

The following non-limitative examples more particularly illustrate the present invention.

EXAMPLE 1

A solution of 7.3 g. (0.05 mol) p-azidobenzaldehyde, 75 ml. methanol, 12 mol (0.1 mol) acetoacetic acid methyl ester, and 5 ml. of concentrated ammonia was stirred for 6 hours. 2,6-dimethyl-4-(4'-azidophenyl)-1,4-dihydropyridine-3,5-dicarboxylic acid dimethyl ester of M.P. 174° C. (ligroin) was obtained.

EXAMPLE 2

A solution of 5.15 g. (0.035 mol) p-azidobenzaldehyde, 50 ml. ethanol, 9.1 g. (0.07 mole) acetoacetic acid ethyl ester and 3.5 ml. of concentrated ammonia was heated for 4 hours. 2,6-dimethyl-4-(4'-azidophenyl)-1,4-dihydropyridine-3,5-dicarboxylic acid diethyl ester of M.P. 131° C. (ligroin) was obtained.

EXAMPLE 3

A solution of 5.15 g. (0.035 mol) p-azidobenzaldehyde, 50 ml. isopropanol, 10.1 g. (0.07 mol) acetoacetic acid isopropyl ester and 3.5 ml. of concentrated ammonia was heated for 3 hours. 2,6-dimethyl-4-(4'-azidophenyl)-1,4-dihpdropyridine-3,5-dicarboxylic acid diisopropyl ester of M.P. 152° C. (n-hexane) was thus obtained.

EXAMPLE 4

A solution of 7.3 g. (0.05 mol) m-azidobenzaldehyde, 7.5 ml. methanol, 12 ml. (0.1 mol) aceto-acetic acid methyl ester and 5 ml. of concentrated ammonia was heated for 6 hours. 2,6-dimethyl-4-(3'-azidophenyl)-1,4-dihydropyridine-3,5-dicarboxylic acid dimethyl ester of M.P. 165° C. (ethanol) was obtained.

EXAMPLE 5

A solution of 5.15 g. (0.035 mol) m-azidobenzaldehyde, 50 ml. ethanol, 9.1 g. (0.07 mol) acetoacetic acid ethyl ester and 3.5 ml. of concentrated ammonia was heated for 5 hours. 2,6-dimethyl-4-(3'-azidophenyl)-1,4-dihydropyridine-3,5-dicarboxylic acid diethyl ester of M.P. 139° C. (ethanol) was obtained.

EXAMPLE 6

A solution of 5.15 g. (0.035 mol) m-azidobenzaldehyde, 50 ml. isopropanol, 10.1 g. (0.07 mol) acetoacetic acid isopropyl ester and 3.5 ml. of concentrated ammonia was heated for 3 hours. 2,6-dimethyl-4-(3'-azidophenyl)-1,4-dihydropyridine - 3,5 - dicarboxylic acid diisopropyl ester of M.P. 152° C. (benzene/hexane 3:1) was obtained.

EXAMPLE 7

A solution of 7.3 g. (0.05 mol) m-azidobenzaldehyde, 7.5 ml. ethanol, 18.8 g. (0.1 mol) acetoacetic acid propoxyethyl ester and 5 ml. of concentrated ammonia was heated for 6 hours. 2,6-dimethyl-4-(3'-azidophenyl)-1,4-dihydropyridine-3,5-dicarboxylic acid dipropoxyethyl ester of M.P. 69° C. (ligroin) was obtained.

EXAMPLE 8

A solution of 5.15 g. (0.035 mol) o-azidobenzaldehyde, 50 ml. methanol, 8.1 g. acetoacetic acid methyl ester and 3.5 ml. of concentrated ammonia was heated for 4 hours. 2,6 - dimethyl-4-(2'-azidophenyl)-1,4-dihydropyridine-3,5-dicarboxylic acid dimethyl ester of M.P. 214° C. (isopropanol) was obtained.

In the same way were prepared:

(a) 2,6-dimethyl-4-(2'-azidophenyl)-1,4-dihydropyridine-3,5-dicarboxylic acid diethyl ester from o-azidobenzaldehyde, acetoacetic acid ethyl ester and ammonia.

(b) 2,6-dimethyl-4-(2'-azidophenyl)-1,4-dihydropyridine-3,5-dicarboxylic acid diisopropyl ester from o-azidobenzaldehyde, acetoacetic acid isopropyl ester and ammonia.

(c) 2,6-dimethyl-4-(2'-azidophenyl)-1,4-dihydropyridine-3,5-dicarboxylic acid dipropoxyethyl ester from o-azidobenzaldehyde, acetoacetic acid β-propoxyethyl ester and ammonia.

(d) 2,6-dimethyl-4-(2'-azidophenyl)-1,4-dihydropyridine-3,5-dicarboxylic acid dipropargyl ester from o-azidobenzaldehyde, acetoacetic acid propargylester and ammonia.

(e) 2,6-dimethyl-4-(6'-azido-m-tolyl) - 1,4 - dihydropyridine-3,5-dicarboxylic acid dimethyl ester from 6-azido-m-tolylbenzaldehyde, acetoacetic acid methyl ester and ammonia.

(f) 2,6-dimethyl-4-(6'-azido-m-tolyl) - 1,4 - dihydropyridine-3,5-dicarboxylic acid diethyl ester from 6-azido-m-tolylbenzaldehyde, acetoacetic acid ethyl ester and ammonia.

(g) 2,6-dimethyl-4-(4'-azido-m-tolyl) - 1,4 - dihydropyridine-3,5-dicarboxylic acid dimethyl ester from 4-azido-m-tolylbenzaldehyde, acetoacetic acid methyl ester and ammonia.

(h) 2,6 - dimethyl-4-(2'-azido-4'-chlorophenyl)-1,4-dihydropyridine-3,5-dicarboxylic acid dimethyl ester from 2-azido-4-chlorobenzaldehyde, acetoacetic acid methyl ester and ammonia.

(i) 2,6-dimethyl-4-(2'-azido-4'-chlorophenyl) - 1,4 - dihydropyridine-3,5-dicarboxylic acid diethyl ester from 2-azido-4-chlorobenzaldehyde, acetoacetic acid ethyl ester and ammonia.

(j) 2,6-dimethyl-4-(2'-azido-4'-bromophenyl) - 1,4 - dihydropyridine-3,5-dicarboxylic acid dimethyl ester from 2-azido-4-bromobenzaldehyde, acetoacetic acid methyl ester and ammonia.

(k) 2,6 - dimethyl-4-(2'-azido-4'-bromophenyl)-1,4-dihydropyridine-3,5-dicarboxylic acid diethyl ester from 2-azido-4-bromobenzaldehyde, acetoacetic acid methyl ester and ammonia.

EXAMPLE 9

A solution of 7.3 g. (0.05 mol) p-azido-benzaldehyde, 12 ml. (0.1 mol) acetoacetic acid methyl ester, 4.5 g. methylamine hydrochloride and 25 ml. pyridine was heated for 2 hours. 1,2,6-trimethyl-4-(4'-azidophenyl)-1,4-dihydropyridine-3,5-dicarboxylic acid dimethyl ester of M.P. 140° C. (ligroin) was obtained.

EXAMPLE 10

A solution of 7.3 g. (0.05 mol) p-azidobenzaldehyde, 12.5 ml. (0.1 mol) acetoacetic acid ethyl ester, 4.5 g. methylamine hydrochloride and 25 ml. pyridine was heated for 2 hours. 1,2,6-trimethyl-4-(4'-azidophenyl)-1,4-dihydropyridine-3,5-dicarboxylic acid diethyl ester of M.P. 87° C. (ligroin) was obtained.

EXAMPLE 11

A solution of 7.5 g. (0.05 mol) m-azidobenzaldehyde, 12 ml. (0.1 mol) acetoacetic acid methyl ester, 4.5 g. methylamine hydrochloride and 20 ml. pyridine was heated for 2 hours. 1,2,6-trimethyl-4-(3'-azidophenyl)-1,4-dihydropyridine-3,5-dicarboxylic acid dimethyl ester of M.P. 105° C. (isopropanol) was obtained.

EXAMPLE 12

A solution of 5.15 g. (0.035 mol) m-azidobenzaldehyde, 9.1 g. (0.07 mol) acetoacetic acid ethyl ester, 3.2 g. methylamine hydrochloride and 20 ml. pyridine was heated for 2 hours. 1,2,6-trimethyl-4-(3'-azidophenyl)-1,4-dihydropyridine-3,5-dicarboxylic acid diethyl ester of M.P. 113° C. (isopropanol) was obtained.

EXAMPLE 13

A solution of 5.15 g. (0.035 mol) m-azidobenzaldehyde, 10.1 g. (0.07 mol) acetoacetic acid isopropyl ester, 3.2 g. methylamine hydrochloric and 20 ml. pyridine was heated for 2 hours, 1,2,6-trimethyl-4-(3'-azidophenyl)-1,4-dihydropyridine-3,5-dicarboxylic acid diisopropyl ester of M.P. 93° C. (isopropanol) was obtained.

EXAMPLE 14

A solution of 5.15 g. (0.035 mol) m-azidobenzaldehyde, 9.1 g. (0.07 mol) acetoacetic acid ethyl ester, 5.75 g. benzylamine hydrochloride and 20 ml. pyridine was heated for 2 hours. 1-benzyl-2,6-dimethyl-4-(3'-azidophenyl)-1,4-dihydropyridine-3,5-dicarboxylic acid diethyl ester of M.P. 115° (isopropanol) was obtained.

EXAMPLE 15

A solution of 5.15 g. (0.035 mol) o-azidobenzaldehyde, 8.1 g. (0.07 mol) acetoacetic acid methyl ester, 3.2 g. methylamine hydrochloride and 20 ml. pyridine was heated for 2 hours. 1,2,6-trimethyl-4-(2'-azidophenyl)-1,4-dihydropyridine-3,5-dicarboxylic acid dimethyl ester of M.P. 181° C. (isopropanol) was obtained.

EXAMPLE 16

A solution of 5.15 g. (0.035 mol) o-azidobenzaldehyde, 9.1 g. (0.07 mol) acetoacetic acid ethyl ester, 3.2 g. methylamine hydrochloride and 20 ml. pyridine was heated for 2 hours. 1,2,6-trimethyl-4-(2'-azidophenyl)-1,4-dihydropyridine-3,5-dicarboxylic acid diethyl ester of M.P. 160° C. (isopropanol) was obtained.

In the same way were prepared:

(a) 1,2,6 - trimethy-4-(2'-azidophenyl)-1,4-dihydropyridine-3,5-dicarboxylic acid diisopropyl ester from o-azidobenzaldehyde, acetoacetic acid isopropyl ester and methylamine hydrochloride.

(b) 1,2,6 - trimethyl-4-(2'-azidophenyl)-1,4-dihydropyridine-3,5-dicarboxylic acid diallyl ester from o-azidobenzaldehyde, acetoacetic acid allyl ester and methylamine hydrochloride.

(c) 1 - benzyl-2,6-dimethyl-4-(2'-azidophenyl)-1,4-dihydropyridine-3,5-dicarboxylic acid diethyl ester from o-azidobenzaldehyde, acetoacetic acid ethyl ester and benzylamine hydrochloride.

(d) 1,2,6-trimethyl-4-(6'-azido-m-tolyl)-1,4-dihydropyridine-3,5-dicarboxylic acid dimethyl ester from 6-azido-m-tolylbenzoaldehyde, acetoacetic acid methyl ester and methylamine hydrochloride.

(e) 1,2,6 - trimethyl-4-(2'-azido-4'-chlorophenyl)-1,4-dihydropyridine-3,5-dicarboxylic acid dimethyl ester from 2-azido-4-chlorobenzaldehyde, acetoacetic acid methyl ester and methylamine hydrochloride.

(f) 1 - benzyl-2,6-dimethyl-4-(2'-azido-4'-chlorophenyl)-1,4-dihydropyridine-3,5-dicarboxylic acid dimethyl ester from 2-azido-4-chlorobenzaldehyde, acetoactic acid methyl ester and benzylamine hydrochloride.

TABLE

[The toxicity of the compound of Examples 1–16 was determined in mice. The coronary action of these compounds (Examples 1–16) was determined in the heart of catheterized narcotized dogs.]

| Example No. | Toxicity LD$_{50}$, mg./kg. | Coronary action, mg./kg. |
|---|---|---|
| 1 | >3,000, p.o. | 2, i.v. |
| 2 | >1,000, p.o.; 1,000, i.p. | 0.5–1, i.v. |
| 3 | >4,000, p.o. | 1, i.v. |
| 4 | >4,000, p.o. | 0.02–0.05, i.v. |
| 5 | >1,000, p.o.; >1,000, i.p. | 0.01–0.02, i.v. |
| 6 | >4,000, p.o. | 0.02, i.v. |
| 7 | >4,000, p.o. | 0.01–0.05, i.v. |
| 8 | >4,000, p.o. | 0.05–0.1, i.v. |
| 9 | Not examined | 0.5–1, i.v. (short). |
| 11 | >4,000, p.o. | 1–2, i.v. (>4 hrs. lasting). |
| 12 | >4,000, p.o. | 0.2, i.v. |
| 13 | >4,000, p.o. | 0.3–0.5, i.v. |
| 14 | >4,000, p.o. | 1, i.v. (>2 hrs. lasting). |
| 15 | >4,000, p.o. | 1–2, i.v. |
| 16 | >4,000, p.o. | 0.1–0.2, i.v. |

What is claimed is:

1. A compound of the formula:

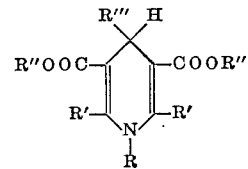

wherein
R is hydrogen, straight or branched lower alkyl or benzyl;
R' is straight or branched alkyl of 1 to 4 carbon atoms;
R" is straight or branched lower alkyl, lower alkenyl or lower alkoxy(lower akyl); and
R'" is azido phenyl further unsubstituted or substituted by alkyl of 1 to 4 carbon atoms or halogeno.

2. A compound according to claim 1, wherein
R is hydrogen, methyl or benzyl,
R' is alky of 1 to 4 carbon atoms,
R" is alky of 1 to 4 carbon atoms, alkenyl of 3 or 4 carbon atoms, alkyl of 1 to 4 carbon atoms substituted by alkoxy of 1 to 3 carbon atoms, and
R'" is azidophenyl or azidopheny substituted by methyl, chloro or bromo.

3. The compound according to claim 1 which is 2,6-dimethyl-4-(4'-azidophenyl) - 1,4 - dihydropyridine-3,5-dicarboxylic acid dimethyl ester.

4. The compound according to claim 1 which is 2,6-dimethyl - 4 - (4' - azidophenyl) - 1,4 - dihydropyridine-3,5-dicarboxylic acid diethyl ester.

5. The compound according to claim 1 which is 2,6-dimethyl - 4 - (4' - azidophenyl) - 1,4 - dihydropyridine-3,5-dicarboxylic acid diisopropyl ester.

6. The compound according to claim 1 which is 2,6-dimethyl - 4 - (3' - azidophenyl) - 1,4 - dihydropyridine-3,5-dicarboxylic acid dimethyl ester.

7. The compound according to claim 1 which is 2,6-dimethyl - 4 - (3' - azidophenyl) - 1,4 - dihydropyridine-3,5-dicarboxylic acid diethyl ester.

8. The compound according to claim 1 which is 2,6-dimethyl - 4 - (3' - azidophenyl) - 1,4 - dihydropyridine-3,5-dicarboxylic acid diisopropyl ester.

9. The compound according to claim 1 which is 2,6-dimethyl - 4 - (3' - azidophenyl) - 1,4 - dihydropyridine-3,5-dicarboxylic acid dipropoxyethyl ester.

10. The compound according to claim 1 which is 2,6-dimethyl-4-(2' - azidophenyl) - 1 - dihydropyridine - 3,5-dicarboxylic acid dimethyl ester.

11. The compound according to claim 1 which is 2,6-dimethyl - 4 - (2' - azidophenyl) - 1,4 - dihydropyridine-3,5-dicarboxylic acid diethyl ester.

12. The compound according to claim 1 which is 2,6-dimethyl - 4 - (2' - azidophenyl) - 1,4 - dihydropyridine-3,5-dicarboxylic acid diisopropyl ester.

13. The compound according to claim 1 which is 2,6-dimethyl - 4 - (2' - azidophenyl) - 1,4 - dihydropyridine-3,5-dicarboxylic acid dipropoxyethyl ester.

14. The compound according to claim 1 which is 2,6-dimethyl - 4 - (2' - azidophenyl) - 1,4 - dihydropyridine-3,5-dicarboxylic acid dipropargyl ester.

15. The compound according to claim 1 which is 2,6-dimethyl-4-(6' - azido - m - tolyl) - 1,4 - dihydropyridine-3,5-dicarboxylic acid dimethyl ester.

16. The compound according to claim 1 which is 2,6-dimethyl - 4 - (6' - azido - m - tolyl) - 1,4 - dihydropyridine-3,5-dicarboxylic acid diethyl ester.

17. The compound according to claim 1 which is 2,6-dimethyl-4-(4' - azido - m - tolyl) - 1,4 - dihydropyridine-3,5-dicarboxylic acid dimethyl ester.

18. The compound according to claim 1 which is 2,6-dimethyl-4-(2'-azido - 4' - chlorophenyl) - 1,4 - dihydropyridine-3,5-dicarboxylic acid dimethyl ester.

19. The compound according to claim 1 which is 2,6-dimethyl-4-(2'-azido - 4' - chlorophenyl) - 1,4 - dihydropyridine-3,5-dicarboxylic acid diethyl ester.

20. The compound according to claim 1 which is 2,6-dimethyl-4 - (2' - azido - 4' - bromophenyl) - 1,4-dihydropyridine-3,5-dicarboxylic acid dimethyl ester.

21. The compound according to claim 1 which is 2,6-dimethyl-4 - (2' - azido - 4' - bromophenyl) - 1,4-dihydropyridine-3,5-dicarboxylic acid diethyl ester.

22. The compound according to claim 1 which is 1,2,6-trimethyl-4-(4'-azidophenyl) - 1,4 - dihydropyridine-3,5-dicarboxylic acid dimethyl ester.

23. The compound according to claim 1 which is 1,2,6-trimethyl-4-(4'-azidophenyl) - 1,4 - dihydropyridine-3,5-dicarboxylic acid diethyl ester.

24. The compound according to claim 1 which is 1,2,6-trimethyl - 4 - (3' - azidophenyl) - 1,4 - dihydropyridine-3,5-dicarboxylic acid dimethyl ester.

25. The compound according to claim 1 which is 1,2,6-trimethyl - 4 - (3' - azidophenyl) - 1,4 - dihydropyridine-3,5-dicarboxylic acid diethyl ester.

26. The compound according to claim 1 which is 1,2,6-trimethyl - 4 - (3' - azidophenyl) - 1,4 - dihydropyridine-3,5-dicarboxylic acid diisopropyl ester.

27. The compound according to claim 1 which is 1-benzyl-2,6-dimethyl - 4 - (3' - azidophenyl) - 1,4 - dihydropyridine-3,5-dicarboxylic acid diethyl ester.

28. The compound according to claim 1 which is 1,2,6-trimethyl - 4 - (2' - azidophenyl) - 1,4 - dihydropyridine-3,5-dicarboxylic acid dimethyl ester.

29. The compound according to claim 1 which is 1,2,6-trimethyl - 4 - (2' - azidophenyl) - 1,4 - dihydropyridine-3,5-dicarboxylic acid diethyl ester.

30. The compound according to claim 1 which is 1,2,6-trimethyl - 4 - (2' - azidophenyl) - 1,4 - dihydropyridine-3,5-dicarboxylic acid diisopropyl ester.

31. The compound according to claim 1 which is 1,2,6-trimethyl - 4 - (2' - azidophenyl) - 1,4 - dihydropyridine-3,5-dicarboxylic acid diallyl ester.

32. The compound according to claim 1 which is 1-benzyl-2,6-dimethyl-4 - (2' - azidophenyl) - 1,4 - dihydropyridine-3,5-dicarboxylic acid diethyl ester.

33. The compound according to claim 1 which is 1,2,6-trimethyl-4-(6'-azido - m - tolyl) - 1,4 - dihydropyridine-3,5-dicarboxylic acid dimethyl ester.

34. The compound according to claim 1 which is 1,2,6-trimethyl - 4 - (2' - azido - 4' - chlorophenyl) - 1,4-dihydropyridine-3,5-dicarboxylic acid dimethyl ester.

35. The compound according to claim 1 which is 1-benzyl-2,6-dimethyl-4-(2'-azido - 4' - chlorophenyl) - 1,4-dihydropyridine-3,5-dicarboxylic acid dimethyl ester.

References Cited
UNITED STATES PATENTS 3,455,939  7/1969  Loev et al. _____ 260—295.5
3,455,945  7/1969  Loev et al. _____ 260—295.5

OTHER REFERENCES

The Merck Index, Seventh Edition, p. 1434, 1960.

ALAN L. ROTMAN, Primary Examiner

U.S. Cl. X.R.

424—266